(12) United States Patent
Hongo et al.

(10) Patent No.: US 6,611,242 B1
(45) Date of Patent: Aug. 26, 2003

(54) INFORMATION TRANSMISSION SYSTEM TO TRANSMIT WORK INSTRUCTION INFORMATION

(75) Inventors: Hitoshi Hongo, Gifu (JP); Mamoru Yasumoto, Ogaki (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/501,223

(22) Filed: Feb. 10, 2000

(30) Foreign Application Priority Data

| Feb. 12, 1999 | (JP) | 11-034242 |
| Feb. 12, 1999 | (JP) | 11-034243 |
| Feb. 12, 1999 | (JP) | 11-034244 |
| Sep. 28, 1999 | (JP) | 11-274968 |
| Sep. 28, 1999 | (JP) | 11-274969 |

(51) Int. Cl.[7] .................................................. G09G 5/00
(52) U.S. Cl. ........................ 345/2.1; 345/2.2; 345/2.3
(58) Field of Search .................... 345/2.1, 2.3, 2.2, 345/753, 756, 672, 660, 661, 788, 799, 800

(56) References Cited

U.S. PATENT DOCUMENTS 5,563,805 A * 10/1996 Arbuckle et al. ............ 345/708
5,781,165 A * 7/1998 Tabata ........................ 345/660

OTHER PUBLICATIONS

MVA '94, IAPR Workshop on Machine Vision Applications, Dec. 13–15, 1994.
Black et al.; Recognizing Temporal Trajectories using the Condensation Algorithm—1998 IEEE.
Okamoto et al.; Direction–Change Features of Imaginary Strokes for On–Line Handwriting Character Recognition, 1998 IEEE.

* cited by examiner

*Primary Examiner*—Vijay Shankar
(74) *Attorney, Agent, or Firm*—Armstrong, Westerman & Hattori, LLP

(57) ABSTRACT

By a first camera fastened to the head of a worker at a remote working environment, an image of an object to be worked on is shot within a range including at least the worker's field of view. This image is transmitted to the work instructor side and displayed on a display device. The work instructor carries out a pointing indication movement with respect to the image of the object displayed on the display device. That movement is shot by a second camera and applied to an instruction information determination unit as video information. The instruction information determination unit generates pointing position information by the well-known gesture recognition process and transmits the information to the worker side. A marker according to the pointing position information transmitted from the work instructor side is overlapped on the image of the object shot by the first camera and displayed on the display of a head mount type display device fastened to the head of the worker. A particular region on the object is indicated by pointing to the worker. At the same time, the work procedure is explained by voice transmission from the work instructor.

4 Claims, 14 Drawing Sheets

INFORMATION TRANSMISSION SYSTEM TO TRANSMIT WORK INSTRUCTION INFORMATION

BACKGROUND OF THE INVENTION

1. Field of the Invention

The present invention relates to information transmission systems. More particularly, the present invention relates to an information transmission system to transmit work instruction information to a worker that is working at a remote complicated working environment from a work instructor.

2. Description of the Related Art

In the case where the work instruction information such as the work procedure is to be provided from a skilled work instructor to a worker who is working at a remote working environment, the instruction information is generally provided via voice using, for example, a telephone.

However, it is usually difficult for the worker to recognize the region to be worked on or the work procedure by just the instruction through voice when working on an object of a complicated task. The working efficiency may be degraded significantly. For example, it is often difficult for a service engineer that is carrying out the maintenance task of a complicated electronic instrument at a remote site to identify the region to be repaired and carry out the required task by just the working instructions from an experienced instructor at the home station through telephone.

A possible consideration is to use a television telephone to convey the working instructions to a worker using image information in addition to voice information. However, the worker still has to rely on the voice information from the instructor as to detecting the region to be worked on from the displayed image and identify what kind of work is to be executed even if the worker obtains both voice information and image information. The problem that the instructed information is not conveyed appropriately is not solved. For example, even if the instructor refers to "this switch" or "that wiring", the worker could not easily identify the relevant position on the image. The working efficiency could not be improved.

SUMMARY OF THE INVENTION

In view of the foregoing, an object of the present invention is to provide an information transmission system that can accurately provide work instruction information from a work instructor to a worker that is working at a remote working environment.

Another object of the present invention is to provide an information transmission system that allows a worker working at a remote working environment to instantly recognize visually the region of an object to be worked on or the work procedure.

A further object of the present invention is to provide an information transmission system that allows a worker working at a remote working environment to visually recognize the task manual information together with an object to be worked on.

According to an aspect of the present invention, an information transmission system to transmit work instruction information from a work instructor to a worker includes an image pickup device, a first transmission device, a first display device, an information input device, a second transmission device, an information combining device, and a second display device. The image pickup device picks up an image of an object to be worked on at the worker side. The first transmission device transmits video information of the object generated by the image pickup device to the work instructor side. The first display device displays the video information transmitted from the first transmission device to the work instructor. The information input device enters the work instruction information by the work instructor based on the video information displayed on the first display device. The second transmission device transmits the work instruction information entered through the information input device to the worker side. The information combining device combines the video information of the object generated by the image pickup device and the work instruction information transmitted from the second transmission device. The second display device displays information combined by the information combine device to the worker.

Accordingly, the worker working at a remote working environment can visually recognize the work instruction information overlapped on the image of the object to be worked on. Therefore, the region of the object or the work procedure can be identified visually at an instant to significantly improve working efficiency.

According to another aspect of the present invention, an information transmission system to transmit work instruction information from a work instructor to a worker includes an image pickup device, a first transmission device, a first display device, a position information input device, a second transmission device, an information combining device, and a second display device. The image pickup device picks up an image of an object to be worked on within a range including at least the worker's field of view. The first transmission device transmits video information of the object generated by the image pickup device to the work instructor side. The first display device displays the video information transmitted from the first transmission device to the work instructor. The position information input device enters pointing position information with respect to the object by the work instructor based on the video information displayed on the first display device. The second transmission device transmits the pointing position information input by the position information input device to the worker. The information combining device combines the video information of the object generated by the image pickup device and marker video information according to the pointing position information transmitted from the second transmission device. The second display device displays information combined by the information combining device to the worker.

Since the worker working at a remote working environment can visually recognize the pointing position information of the work instructor overlapped on the image of the object to be worked on, the region to be worked can be recognized visually at an instant to significantly improve working efficiency.

According to a further aspect of the present invention, an information transmission system to transmit work instruction information from a work instructor to a worker includes an image pickup device, a first transmission device, a first display device, a position information input device, a second transmission device, a moving distance detection device, a correction device, an information combining device, and a second display device. The image pickup device is fastened to the head of the worker to pickup an image of an object to be worked on within a range including at least the worker's field of view. The first transmission device transmits video information of the object generated by the image pickup device to the work instructor side. The first display device displays the video information transmitted from the first transmission device to the work instructor. The position information input device enters pointing position information with respect to the object by the work instructor based on the video information displayed on the first display device. The second transmission device transmits the pointing position information input by the position information input device to the worker side. The moving distance detection device detects the spatial moving distance of the worker's head during a time starting from an image pickup time by the image pickup device up to the time the pointing position information reaches the worker side. The correction device corrects the pointing position information obtained at the worker side corresponding to the spatial moving distance of the head detected by the moving distance detection device. The information combining device combines the video information of the object generated by the image pickup device and marker video information according to the pointing position information corrected by the correction device. The second display device displays the information combined by the information combining device to the worker.

Because the pointing position information of the work instructor is corrected even if the head of the worker to which the image pickup device is fastened moves during the period required for information transmission between the worker and the work instructor, the worker can properly recognize the region to be worked on of the object.

According to still another aspect of the present invention, an information transmission system to transmit work instruction information from a work instructor to a worker includes an image pickup device, a first transmission device, a first display device, a stroke information input device, a second transmission device, an information combining device, and a second display device. The image pickup device picks up an image of an object to be worked on within a range including at least the worker's field of view. The first transmission device transmits video information of the object generated by the image pickup device to the work instructor side. The first display device displays the video information transmitted from the first transmission device to the work instructor. The stroke information input device enters stroke information constituted by continuous pointing positions with respect to the object by the work instructor based on the video information displayed on the first display device. The second transmission device transmits the stroke information input by the stroke information input device to the worker side. The information combining device combines the video information of the object generated by the image pickup device and the stroke video information according to the stroke information transmitted from the second transmission device. The second display device displays information combined by the information combining device to the worker.

Because the worker working at a remote working environment can visually recognize the stroke information of the work instructor overlapped on the image of the object to be worked on, the region of the object or the work procedure can be recognized visually at an instant to significantly improve working efficiency.

According to a still further aspect of the present invention, an information transmission system to transmit work instruction information from a work instructor to a worker includes an image pickup device, a first transmission device, a first display device, a stroke information input device, a character recognition device, a second transmission device, an information combining device, and a second display device. The image pickup device picks up an image of an object to be worked on within a range including at least the worker's field of view. The first transmission device transmits video information of the object generated by the image pickup device to the work instructor side. The first display device displays the video information transmitted from the first transmission device to the work instructor. The stroke information input device enters stroke information constituted by continuous pointing positions with respect to the object by the work instructor based on the video information displayed on the first display device. The character recognition device recognizes a character corresponding to the input stroke information to generate corresponding character information. The second transmission device transmits the character information generated by the character recognition device to the worker side. The information combining device combines the video information of the object generated by the image pickup device and the character video information according to the character information transmitted from the second transmission device. The second display device displays information combined by the information combine device to the worker.

Because the worker working at a remote working environment can recognize visually the character information of the work instructor overlapped on the image of the object to be worked on, the region of the object or the work procedure can be recognized visually at an instant to significantly improve working efficiency.

According to yet a further aspect of the present invention, an information transmission system to transmit work instruction information from a work instructor to a worker includes an image pickup device, a first transmission device, a first display device, an information storage device, an information select device, a second transmission device, an information combining device, and a second display device. The image pickup device picks up an image of an object to the worked on within a range including at least the worker's field of view. The first transmission device transmits video information of the object generated by the image pickup device to the work instructor side. The first display device displays the video information transmitted from the first transmission device to the work instructor. A plurality of task manual information files are stored in the information storage device. The information select device selects a particular task manual information file from the plurality of task manual information files in response to an indication of the work instructor based on the video information displayed on the first display device. The second transmission device transmits the task manual information file selected by the information selection device to the worker side. The information combining device combines the video information of the object generated by the image pickup device and the task manual video information according to the task manual information file transmitted from the second transmission device. The second display device displays information combined by the image combining device to the worker.

Because the worker working at a remote working environment can recognize visually the task manual information overlapped on the image of the object to be worked on, the work procedure can be recognized visually at an instant to significantly improve working efficiency.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described hereinafter with reference to the drawings.

(1) First Embodiment

In the information transmission system of each embodiment of the present invention, a work instructor B having skillful knowledge on the relevant work provides working instructions to a worker A present at a remote working environment.

Figure 1:
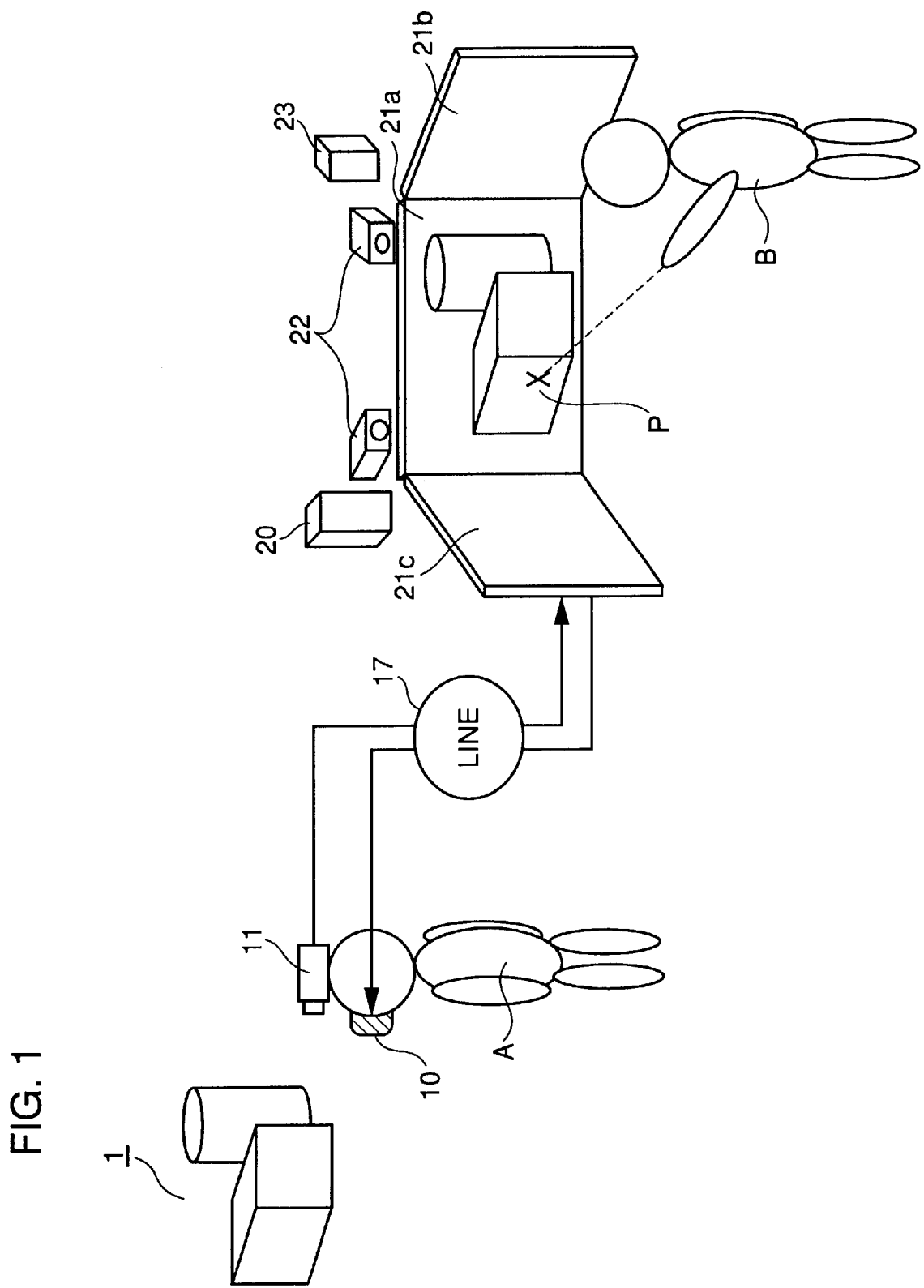
FIG. 1 is a schematic diagram of the concept of an information transmission system according to a first embodiment of the present invention.

Referring to FIG. 1, a head mount type display device 10 and a camera 11 are attached to the head of worker A. Head mount type display device 10 includes a microphone 12, a display 13, and a speaker 16 shown in FIG. 2. Display 13 is formed of an LCD and the like to display a video signal that will be described afterwards to worker A. Microphone 12 and speaker 16 are provided to provide voice communication between worker A and work instructor B.

Figure 2:
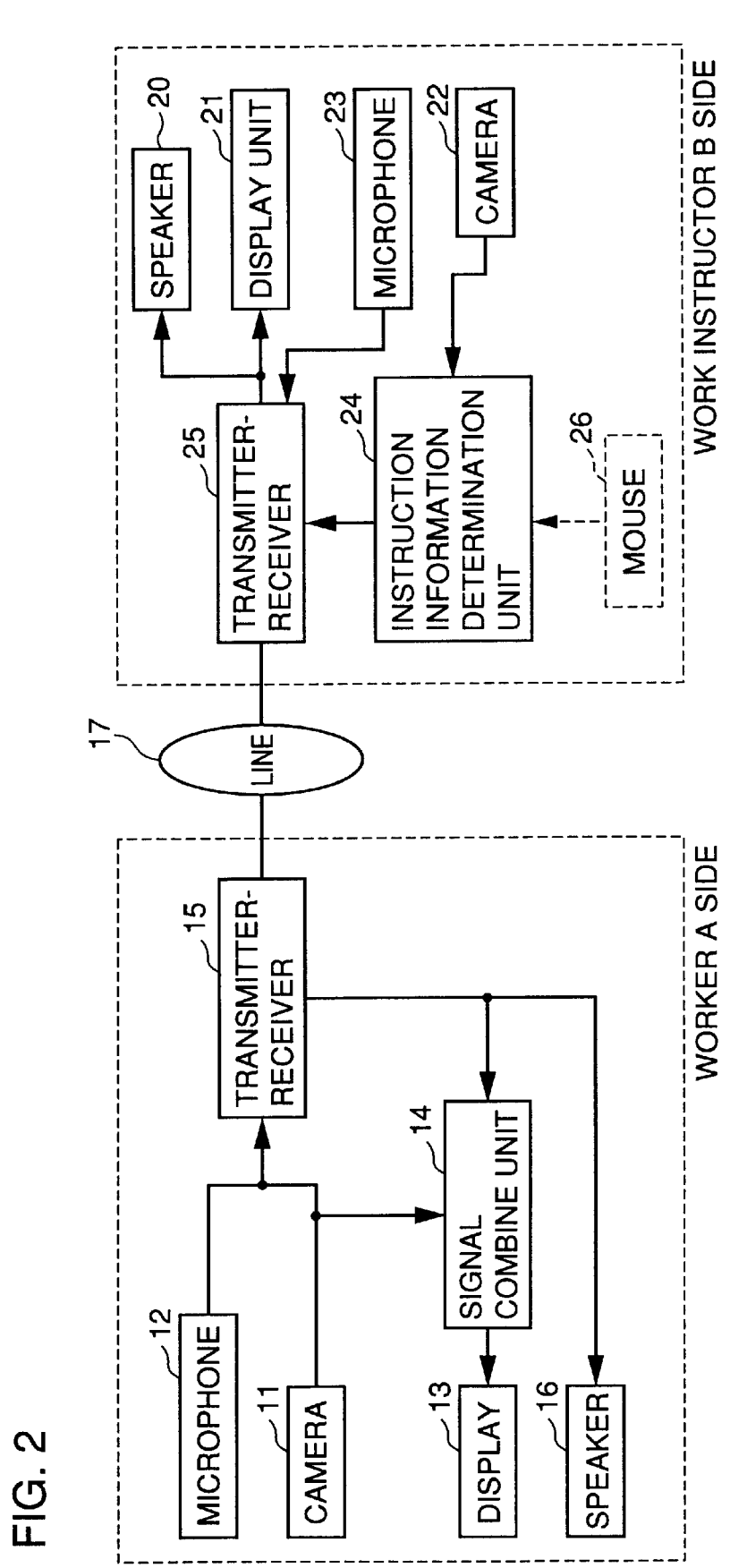
FIG. 2 is a schematic block diagram of the information transmission system of the first embodiment.

Camera 11 formed of a compact CCD and the like is capable of shooting a wide angle larger than the human's field of view. An object 1 to be worked on and the neighborhood are shot at real time to generate video information. Referring to FIG. 2, video information generated by camera 11 and voice information generated by microphone 12 are transmitted to the work instructor B side via a transmitter-receiver 15 (contained in head mount type display device 10) and a wire or wireless line 17. The video information generated by camera 11 is also applied to a signal combining unit 14 (contained in head mount type display device 10) of FIG. 2.

Referring to FIG. 2, the video information and voice information transmitted from the worker A side is received by a transmitter-receiver 12 (not shown in FIG. 1) at the work instructor B side. The video information is displayed on a display unit 21 formed of a display, a projector, or the like. Voice information is output in voice from speaker 20.

Display unit 21 is formed of display regions 21a, 21b and 21c, as shown in FIG. 1. As mentioned before, video information of a wide angle larger than the worker A's field of view is supplied from camera 11. Video information of a region approximating that of the worker A's field of view is displayed at display region 21a. The video information of a region outside the worker A's field of view is displayed at display regions 21b and 21c. Video information of a region corresponding to the aforementioned display region 21a, i.e., the region approximating the worker A's field of view, is supplied from camera 11 via signal combining unit 14 to be displayed on display 13 at the worker A side.

Referring to FIGS. 1 and 2, camera 22 shoots a work indication movement of work instructor B while microphone 23 collects the instruction voice of work instructor B. An instruction information determination unit 24 (not shown in FIG. 1) of FIG. 2 determines the indication movement of work instructor B shot by camera 22 to generate and provide to a transmitter-receiver 25 the instruction information that will be described afterwards. Transmitter-receiver 25 transmits this instruction information and the voice information from microphone 23 to transmitter-receiver 15 of the worker A side via line 17.

Referring to FIG. 2, the instruction information received at transmitter-receiver 15 is overlapped on the video information from camera 11 by a signal combining unit 14. The resultant video information is displayed to worker A through display 13 contained in head mount type display device 10 (FIG. 1). The voice information received at transmitter-receiver 15 is output in voice to worker A from speaker 16 contained in head mount type display 10.

The wire or wireless line 17 may be a public telephone line or leased line, or any special line.

The operation of the information transmission system of the first embodiment shown in FIGS. 1 and 2 will be described here.

When worker A present at a remote working environment views object 1, this object 1 is shot by camera 11. Also, the sound around the object 1 and the voice of worker A is collected by microphone 12. The video output of camera 11 and voice output of microphone 12 are transmitted to the work instructor B side via transmitter-receiver 15 and line 17. Video information of a range wider than the worker A's field of view shot by camera 11 is displayed on display unit 21 whereas the voice collected by microphone 12 is output through speaker 20.

Work instructor B views the image of object 1 displayed on display unit 21 to indicate a particular region on object 1 that is to be indicated to worker A by the gesture of pointing. In the example of FIG. 1, work instructor B indicates a particular region P on the image of object 1 by the gesture of pointing. At the same time, work instructor B explains the work procedure through voice.

The pointing indication movement of work instructor B by gesture is shot by camera 22 and converted into video information to be applied to an instruction information determination unit 24. Instruction information determination unit 24 detects the position information of point P indicated by work instructor B by the well-known gesture recognition process, direction detection process, and the like. The process carried out by instruction information determination unit 24 (fingertip direction detection) is well-known, and disclosed in, for example, "Uncalibrated Stereo Vision with Pointing for a Man-machine Interface" In Proc. IAPR Workshop on Machine Vision Applications, Kawasaki, pp.163–166, (December) 1994 by R. Cipolla, P. A. Hadfield, and N. J. Hollinghurst. The disclosure of this document is incorporated herein by reference, and detailed description of the process will not be repeated.

The pointing position information (position information of point P in FIG. 1) by work instructor B detected by instruction information determination unit 24 and the voice instruction of work instructor B collected through microphone 23 are sent to the worker A side via transmitter-receiver 25 and line 17. The pointing position information is supplied to a signal combining unit 14. Voice information is supplied to speaker 16.

Figure 3:
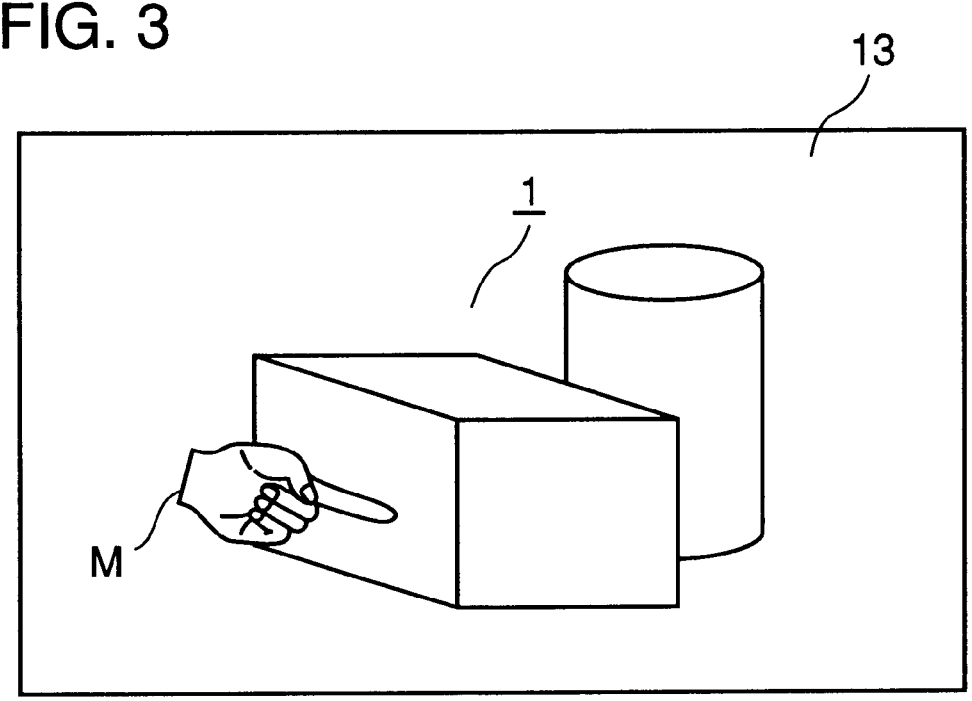
FIG. 3 is a schematic diagram showing one form of an image displayed to the worker in the information transmission system of the first embodiment.

Signal combining unit 14 generates video information of a pointing character (referred to as "marker" hereinafter) at a relevant position according to the received pointing position information. The marker video information is overlapped on the video information of a region approximating the worker A's field of view supplied from camera 11 to be displayed on display 13 contained in head mount type display device 10. FIG. 3 schematically shows object 1 and marker M displayed on display 13. At the same time, the voice of work instructor B explaining the work procedure is output from speaker 16 contained in head mount type display device 10.

Worker A wearing head mount type display device 10 can visualize the pointing position information (marker M) overlapped on the image of object 1. Therefore, the region to be worked on can be recognized instantly. Also, working efficiency can be further improved by virtue of the voice of work instructor B explaining the work procedure.

Furthermore, work instructor B can identify the status of the neighborhood of object 1 by the wide-angle video information (displayed on display regions 21b and 21c) from camera 11. Therefore, a more appropriate working instruction can be provided instantly in comparison to the case where working instructions are provided only by the view of the image of object 1.

In the first embodiment, the pointing position information is input by the gesture recognition of work instructor B. Alternatively, the pointing position information can be input to instruction information determination unit 24 by means of a coordinate information input device such as a mouse 26.

(2) Second Embodiment

In the information transmission system of the first embodiment shown in FIG. 2, camera 11 that shoots object 1 is fastened to the head of worker A. There is a time lag starting from the transmission of the video information from camera 11 to the work instructor B side and up to the time when the pointing position instruction by work instructor B is detected and transmitted to the worker A side. The head of worker A may move during this period. In such a case, the pointing position cannot be displayed properly on the combined image obtained by signal combining unit 14. For example, if the head of worker A moves rightwards during this period, the position of marker M that is overlapped will be displayed rightwards offset from the original position to be displayed on object 1. In this case, the pointing position information must be corrected so that the position of marker M is moved leftwards to be displayed at the proper display position.

Figure 4:
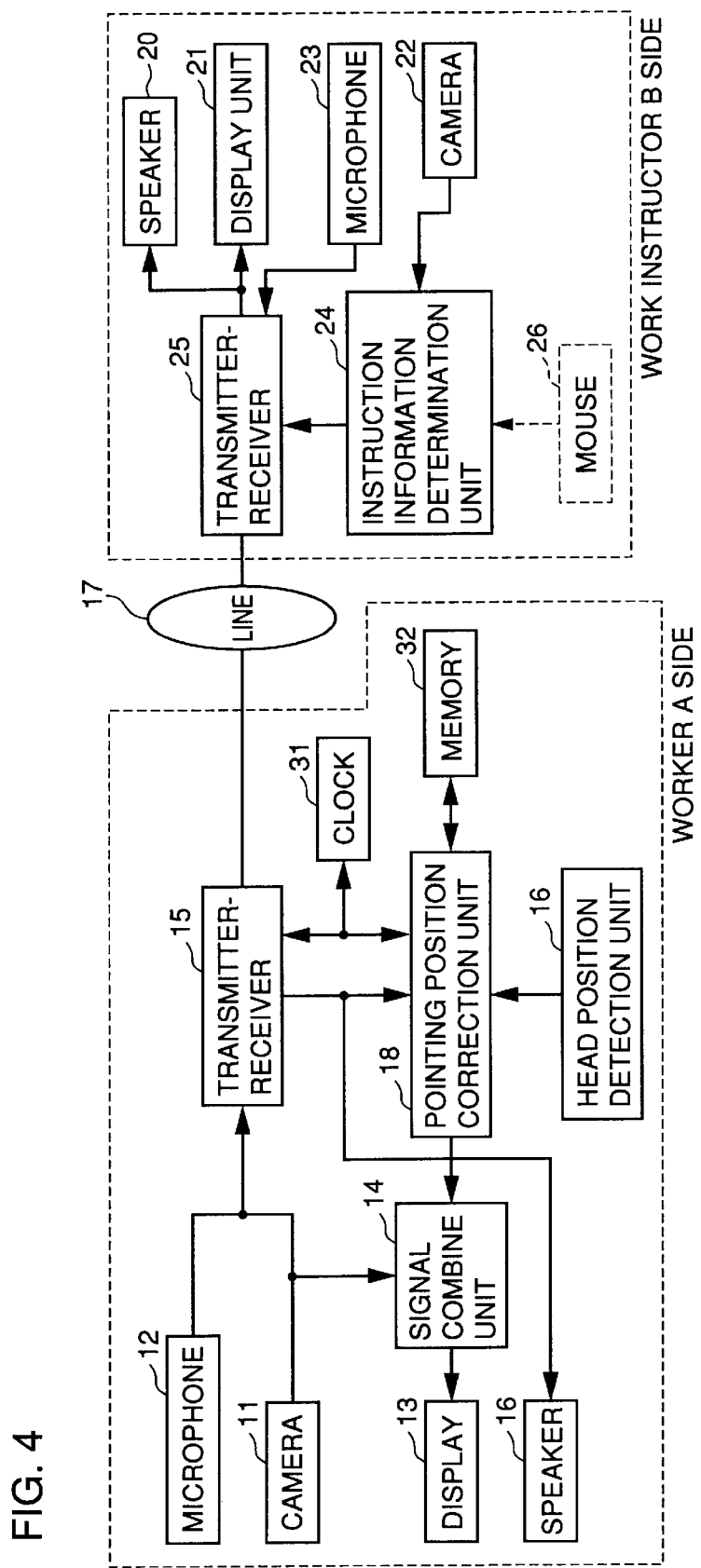
FIG. 4 is a schematic block diagram of an information transmission system according to a second embodiment of the present invention.

The information transmission system of the present second embodiment shown in FIG. 4 allows this correction of the pointing position information. The information transmission system of the second embodiment has a structure identical to that of the information transmission system of the first embodiment shown in FIG. 2 except for the features described hereinafter. Therefore, description of common elements will not be repeated.

In the information transmission system of the second embodiment shown in FIG. 4, time information from a clock 31 indicating the shooting time of camera 11 is always assigned at transmitter-receiver 15 for the video information of object 1 generated by camera 11 and transmitted to the work instructor B side. The direction of the head of worker A is constantly detected by a head position detection unit 16. The detected result is stored in a memory 32 in correspondence with the time information from clock 31. It is assumed that the head position information for the past several seconds is stored in memory 32.

At the work instructor B side, a process identical to that of the first embodiment shown in FIG. 2 is carried out. The pointing position information of work instructor B is detected and transmitted to transmitter-receiver 15 of the worker A side via line 17. It is to be noted that time information indicating the shooting time assigned to the video information of camera 11 is attached to the pointing position information.

At pointing position correction unit 18, the head position information at the received shooting time is read out from memory 32 and compared with the current head position information detected by head position detection unit 16 to calculate the head moving distance during the period required for transmitting and receiving information between the worker A side and the work instructor B side. The pointing position information is corrected to position information suiting the image of the currently-shot object 1 according to the calculated moving distance. The corrected position information is applied to signal combining unit 14.

Figure 5:
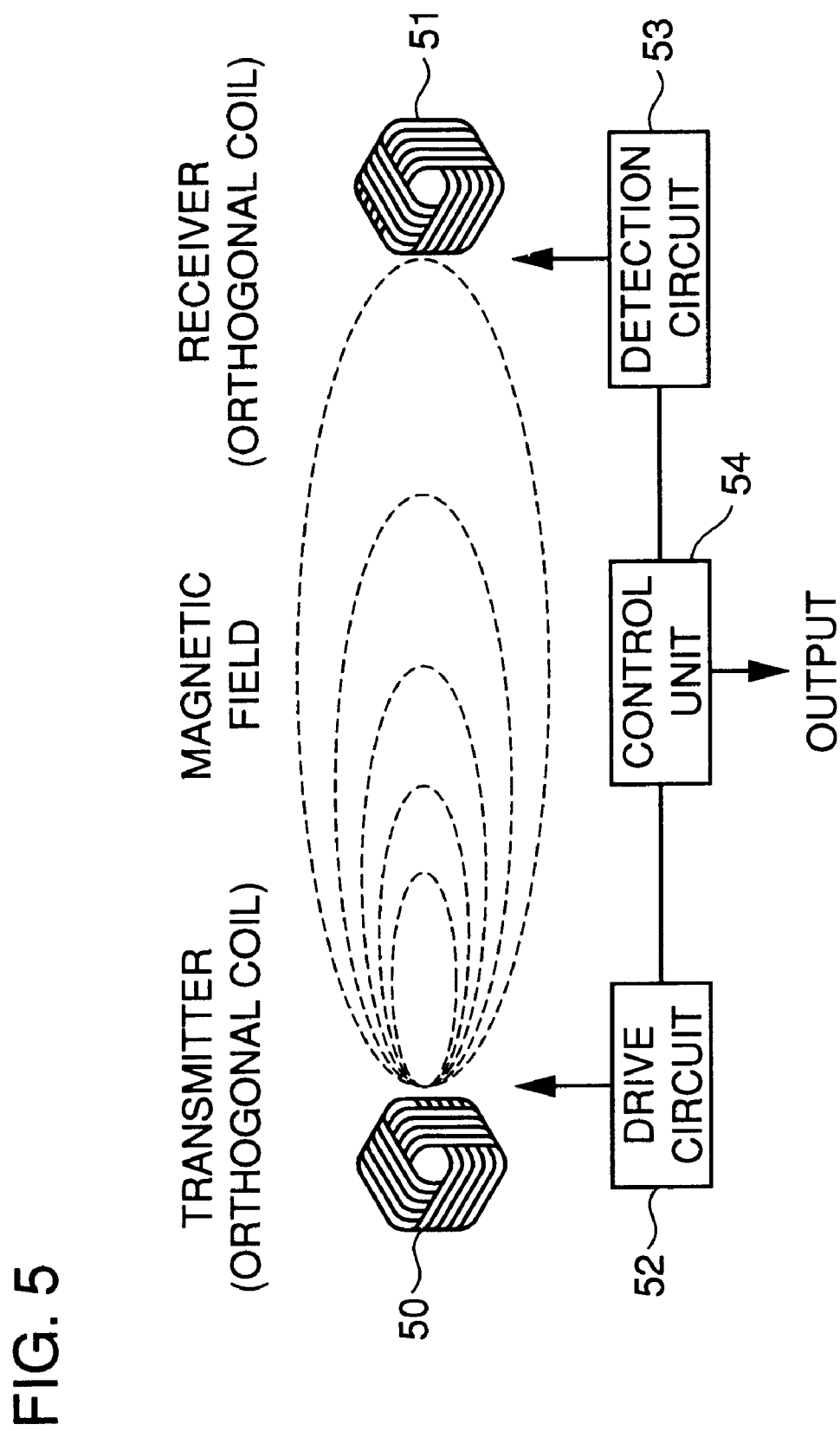
FIG. 5 is a block diagram of a structure of a magnetic sensor as an example of a head direction detection unit employed in the information transmission system of the second embodiment.

FIG. 5 schematically shows the structure of a three dimensional position sensor of high accuracy as an example of head position detection unit 16. This position sensor is available on the market as a product (3SPACE FASTRAK) from Polhemus, and the detection principle is well-known. The detection principle of this position sensor is based on current being induced by placing a coil in a magnetic field to determine the intensity of that current by the distance and direction of the coil with respect to the magnetic field generation source. Specific description is provided hereinafter.

(i) Referring to FIG. 5, a magnetic field generation source (transmitter) 50 is formed of orthogonal coils for axes of x, y and z. An alternating magnetic field of approximately 10 kHz is generated by conducting a current to the orthogonal coils. The three orthogonal coils corresponding to respective axes of x, y and z are sequentially excited in a time-divisional manner by a drive circuit 52.

(ii) By placing a receiver 51 formed of orthogonal coils similar to those of transmitter 50 within the magnetic field, a current is generated in each of the x coil, y coil, and z coil of receiver 51 to be detected by a detection circuit 53. The intensity of each current is determined by the distance and posture (angle) of receiver 51 with respect to transmitter 50.

(iii) As a result, nine types of parameters are obtained at receiver 51. By applying matrix operation on these parameters by a control unit 54, the position and posture (angle) of receiver 51 are measured.

By application of such magnetic conversion technique, the latest three-dimensional position sensor can detect in real time the degree of freedom of six types, i.e., the three dimensional position coordinate values (X, Y, and Z) and the Euler angles (pitch, yaw, roll) of the receiver formed of orthogonal coils. This six degree of freedom implies the position (x, y, x) and posture (angle) of the receiver.

Figure 6:
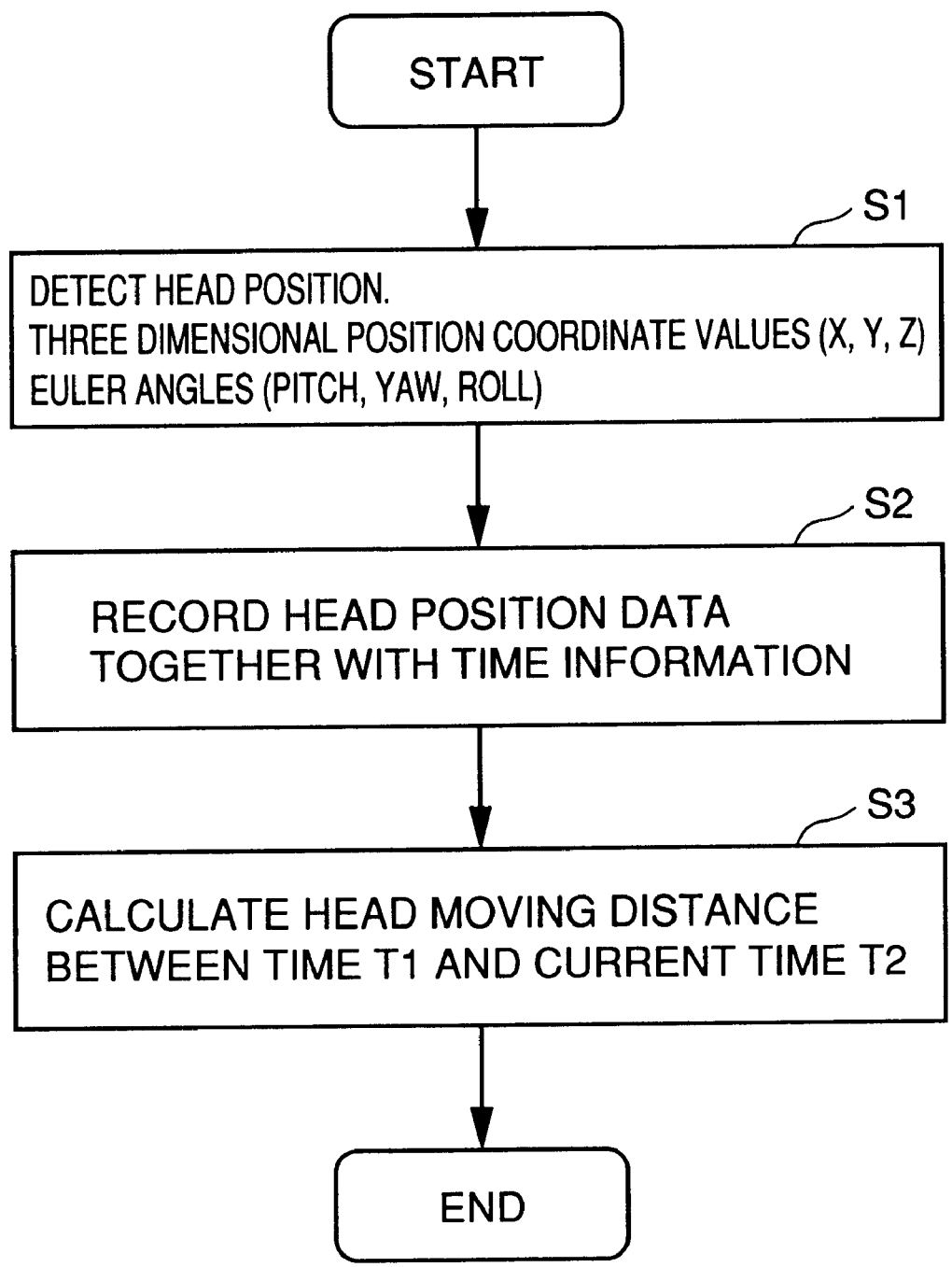
FIG. 6 is a flow chart showing a pointing position correction operation of the information transmission system of the second embodiment.

Referring to the flow chart of FIG. 6, the correction operation process by pointing position correction unit 18 formed of a processor will be described here. At head position detection unit 16, information related to the head position of worker A, i.e., the three-dimensional position coordinate values (X, Y, Z) and Euler angles (pitch, yaw, roll), is detected by the above-described detection principle (step S1).

Then, the detected head position data is stored in memory 32 in correspondence with the time information of detection (step S2). When the pointing position information assigned with the time information t1 of shooting from the work instructor B side is transmitted to the worker A side, the head position data of shooting time t1 is read out from memory 32, and the head position data of the current time t2 is detected. The head moving distance from time t1 to t2 is calculated (step S3). Head moving distance Dt12 is calculated by the following equation:

$$Dt12=\{(Xt2-Xt1)^2+(Yt2-Yt1)^2+(Zt2-Zt1)^2\}^{1/2}$$

The pointing position information is corrected according to the moving distance calculated by the above equation and the amount of change of the Euler angles.

By the above-described correction of the pointing position information, the pointing position information is corrected to suit the current image of object 1 even if the head of worker A to which camera 11 is fastened moves during the period required for information transmission between worker A and work instructor B. Therefore, worker A can visualize properly the region to be worked on the display screen of display 13.

Since marker M is displayed in an overlapped manner on the image of the object on display 13 in the first and second embodiments, a case may occur where the display is not visually acceptable to worker A. In that case, marker M may be displayed in a blinking manner.

Also, a structure may be provided in which a sound effect that facilitates recognition of the marker position can be output from speaker 16 contained in head mount display device 10 corresponding to the position of marker M. For example, recognition of the position of marker M is further facilitated for worker A by issuing a sound effect from the right side of worker A in head mount type display device 10 when marker M is located at the right side of the screen of display 13, and issuing a sound effect from the left side of worker A in head mount type display device 10 when marker M is located at the left side on the screen of display 13.

(3) Third Embodiment

In the information transmission system of the first and second embodiments shown in FIGS. 1–6, a certain region (point) on the image of the object to be worked on can be indicated to worker A by pointing. However, stroke information constituted by continuous points on the image cannot be applied to worker A in the first and second embodiments.

Figure 7:
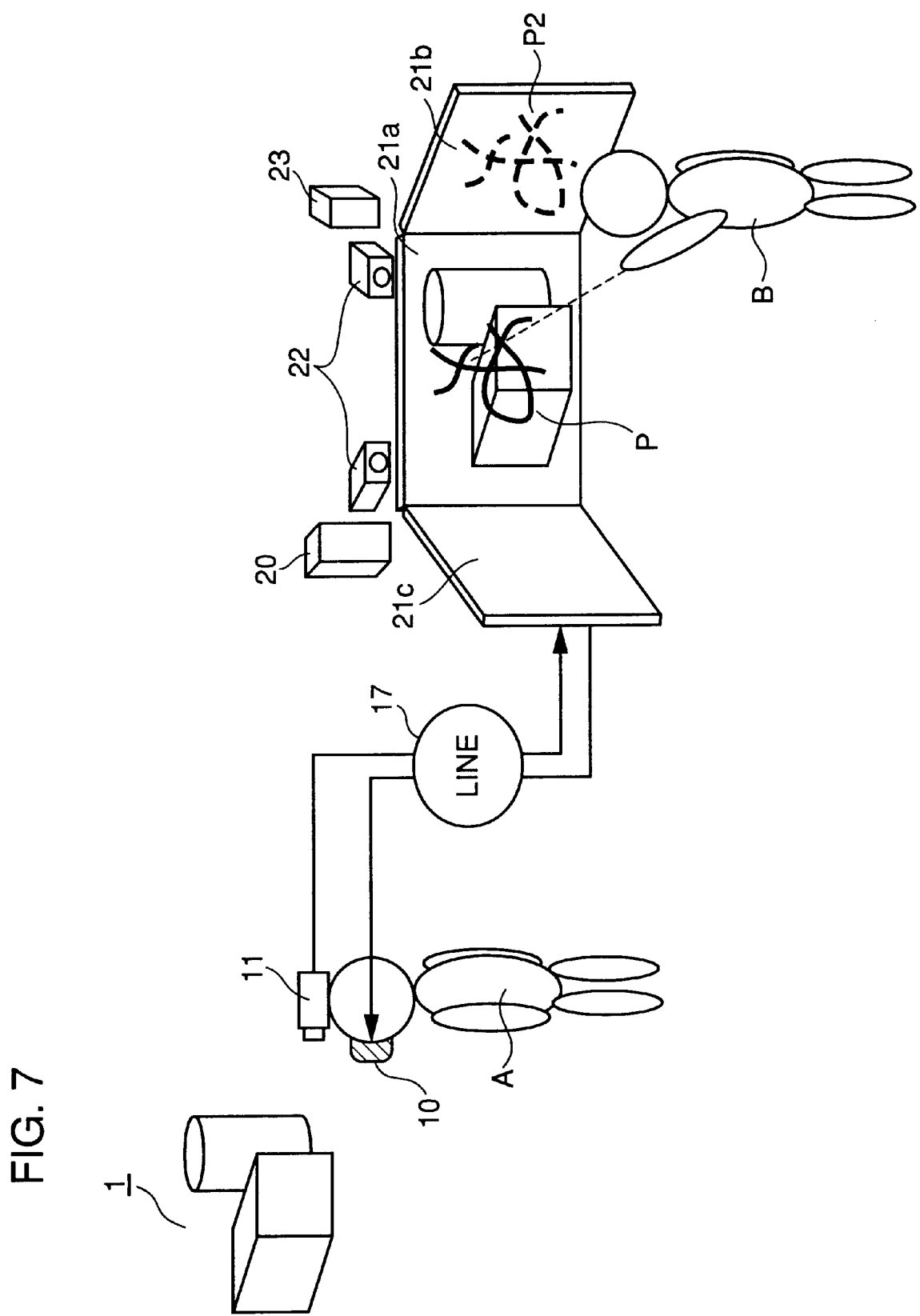
FIG. 7 schematically shows the concept of an image transmission system according to a third embodiment of the present invention.
Figure 8:
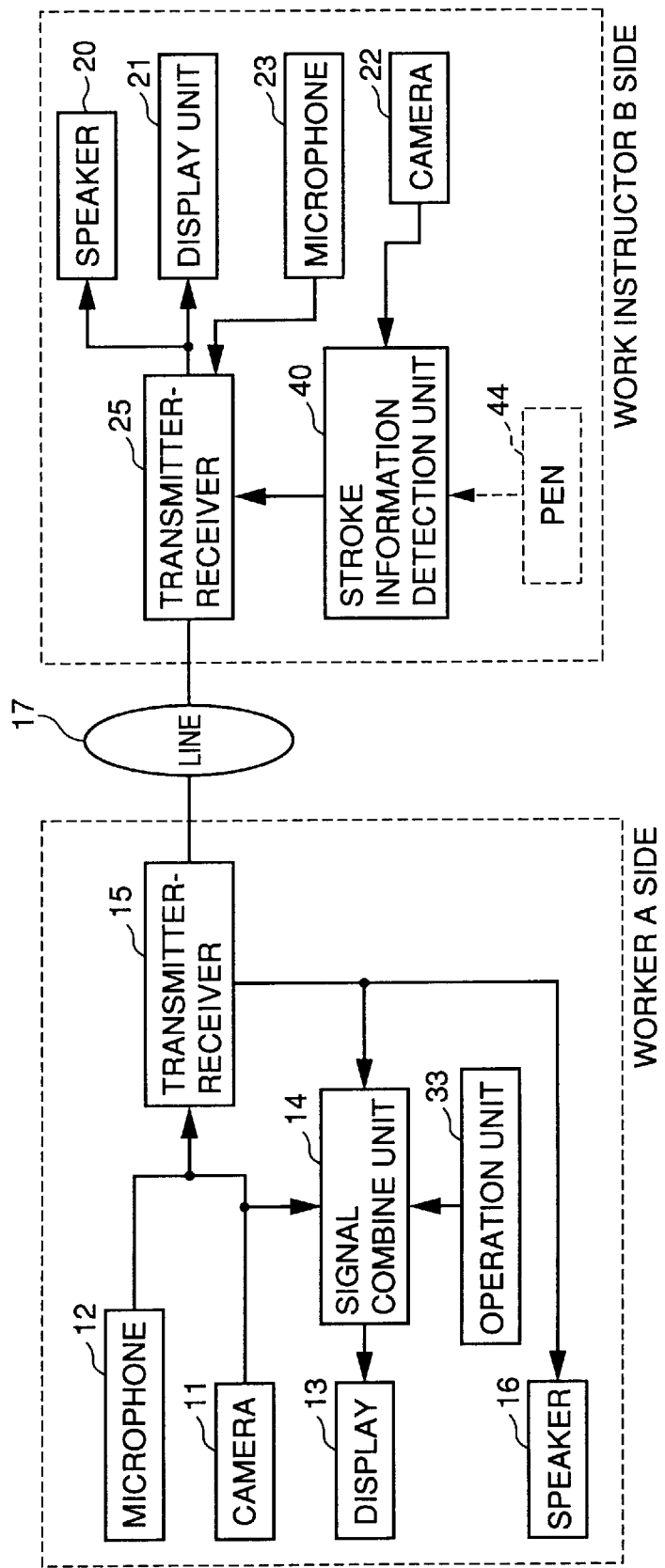
FIG. 8 is a schematic block diagram of the information transmission system of the third embodiment.

An information transmission system of the third embodiment shown in FIGS. 7 and 8 is capable of providing a display of such stroke information. The information transmission system of the third embodiment has a structure identical to that of the information transmission system of the first embodiment shown in FIGS. 1 and 2 except for the features described hereinafter. Therefore, description of common elements will not be repeated.

In the information transmission system of the third embodiment of FIG. 8, the gesture video information of work instructor B shot by camera 22 is supplied to a stroke information detection unit 40. Stroke information detection unit 40 determines the gesture of work instructor B to generate and provide to transmitter-receiver 25 stroke information that will be described afterwards. Transmitter-receiver 25 sends the stroke information and the voice information from microphone 23 to transmitter-receiver 15 of the worker A side via line 17.

The stroke information received at transmitter-receiver 15 is overlapped with the video information of object 1 from camera 11 at signal combining unit 14. The resultant video information is displayed to worker A through display 13 contained in head mount type display device 10 (FIG. 1).

Although not shown in FIG. 1, an operation unit 33 is provided at the side face of head mount type display device 10. Worker A can command a combine operation of the video information in signal combine unit 14 as will be described afterwards. This operation unit 33 employs a mechanism that can be commanded by the touch of worker's finger without having to look at operation unit 33.

The operation of the information transmission system according to the third embodiment of FIGS. 7 and 8 will be described here.

The image of object 1 shot by camera 11 of worker A is displayed at display unit 21 of the work instructor B side, as in the first embodiment. Work instructor B delineates an arbitrary stroke image P formed of continuous pointing positions by gesture while viewing the image of object 1 displayed on display unit 21. At the same time, work instructor B explains the work procedure by voice. In other words, worker A can recognize the working instruction more appropriately by the stroke image on the image of object 1 and voice.

In the example of FIG. 7, work instructor B delineates an arbitrary stroke image P on the image displayed on display region 21a of display unit 21. Alternatively, a stroke image P2 as indicated by the broken line can be delineated on another display region, for example, in display region 21b of FIG. 7.

The drawing movement of the stroke image by the gesture of work instructor B is shot by camera 22 and converted into video information to be applied to stroke information detection unit 40. Stroke information detection unit 40 detects the stroke information to form the stroke image delineated by work instructor B by the well-known gesture recognition process, direction detection process, and the like. The process (stroke detection) carried out by stroke information detection unit 40 is well-known, and disclosed in, for example, "Recognizing Temporal Trajectories Using the Condensation Algorithm", Proc. of the Third International Conference on Automatic Face and Gesture Recognition (FG'98), pp. 16–21 (1998) by M. J. Black, and A. D. Jepson. The disclosure of this document is incorporated herein by reference. Therefore, detailed description of the process will not be repeated here.

The stroke information detected by stroke information detection unit 40 and the voice instruction of work instructor B collected by microphone 23 are transmitted to the worker A side via transmitter-receiver 25 and line 17. The stroke information is supplied to signal combining unit 14. The voice information is supplied to speaker 16.

Figure 10A:
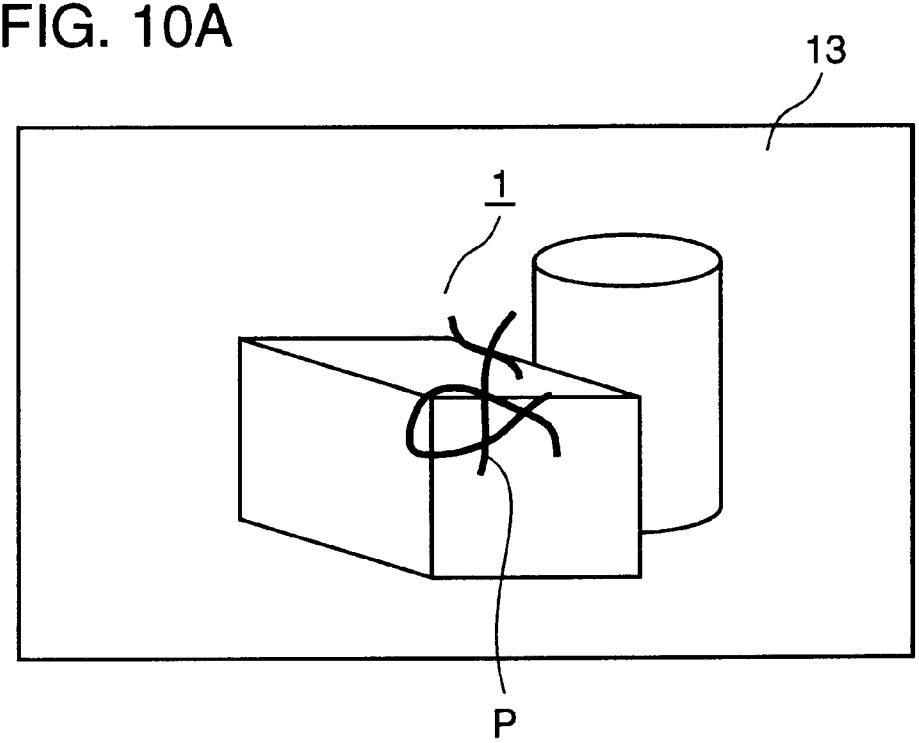
FIGS. 10A and 10B are schematic diagrams showing forms of images displayed to the worker in the information transmission systems of the third and fourth embodiments, respectively.

Signal combining unit 14 generates stroke video information according to the received stroke information. The stroke video information is overlapped on the video information of a region approximating the worker A's field of view supplied from camera 11 to be displayed on display 13 contained in head mount type display device 10. FIG. 10A schematically shows the image of object 1 and stroke image P displayed on display 13. At the same time, the voice of work instructor B explaining the work procedure is output from speaker 16 contained in head mount type display advice 10.

Stroke image P is overlapped on the image of object 1, as shown in FIG. 10A. There is a case where object 1 is not clearly viewed due to the 30 overlap therebetween.

In this case, worker A can operate operation unit 33 provided at the side face of head mount type display device 10 to specify arbitrarily the display position of the stroke image to move the stroke image P to a position that does not overlap with the image of object 1.

However, there may be a case where the stroke image itself is so large that it will inevitably overlap with the image of object 1 even if the display position is altered. There may also be the case where the stroke image is too small to be viewed clearly. In these cases, worker A can operate operation unit 33 to specify arbitrarily the size of the stroke image such as shrinking the stroke image (for example, reduced to 50%) to avoid overlapping on object 1 when the stroke image is too large, or magnifying the stroke image (for example, increased to 150%) to a size for better visibility when the stroke image is too small.

When the stroke image is not necessary, worker A can operate operation unit 33 to command inhibition of the overlap of the stroke image on the image of object 1.

According to various commands from operation unit 33, signal combine unit 14 displays on display 13 the stroke image at the position and in the display scale rate specified through operation unit 33, and also displays only the image of object 1 without overlapping the stroke image when overlapping of the stroke image is inhibited through operation unit 33.

Thus, worker A wearing head mount type display device 10 can visually recognize the stroke image overlapped on the image of object 1, so that the region to be worked on or the work procedure can be understood instantly. The working efficiency can be further improved since the explanation of the work procedure is provided through the voice of work instructor B. Also, recognition through the visual image of the object 1 can be further facilitated by arbitrarily specifying the size and position of the stroke image through operation unit 33, or by removing the stroke image from the display screen.

In the third embodiment, the stroke information is input by gesture recognition of work instructor B. Alternatively, the stroke information can be input using a coordinate information input device such as a pen 44.

(4) Fourth Embodiment

In the information transmission system of the third embodiment shown in FIG. 8, the stroke information forming the stroke delineated by work instructor B on the image displayed on display region 21 is detected by stroke information detection unit 40. The stroke of an arbitrary character can be delineated as shown by the broken line P2 in FIG. 7 on display regions 21b and 21c.

The information transmission system according to a fourth embodiment of the present invention can carry out a character recognition process according to the stroke information of an arbitrary character drawn by the work instructor.

The information transmission system of the fourth embodiment shown in FIG. 9 has a structure identical to that of the information transmission system of the third embodiment shown in FIG. 8 except for the features described hereinafter. Therefore, description of common elements will not be repeated.

Figure 9:
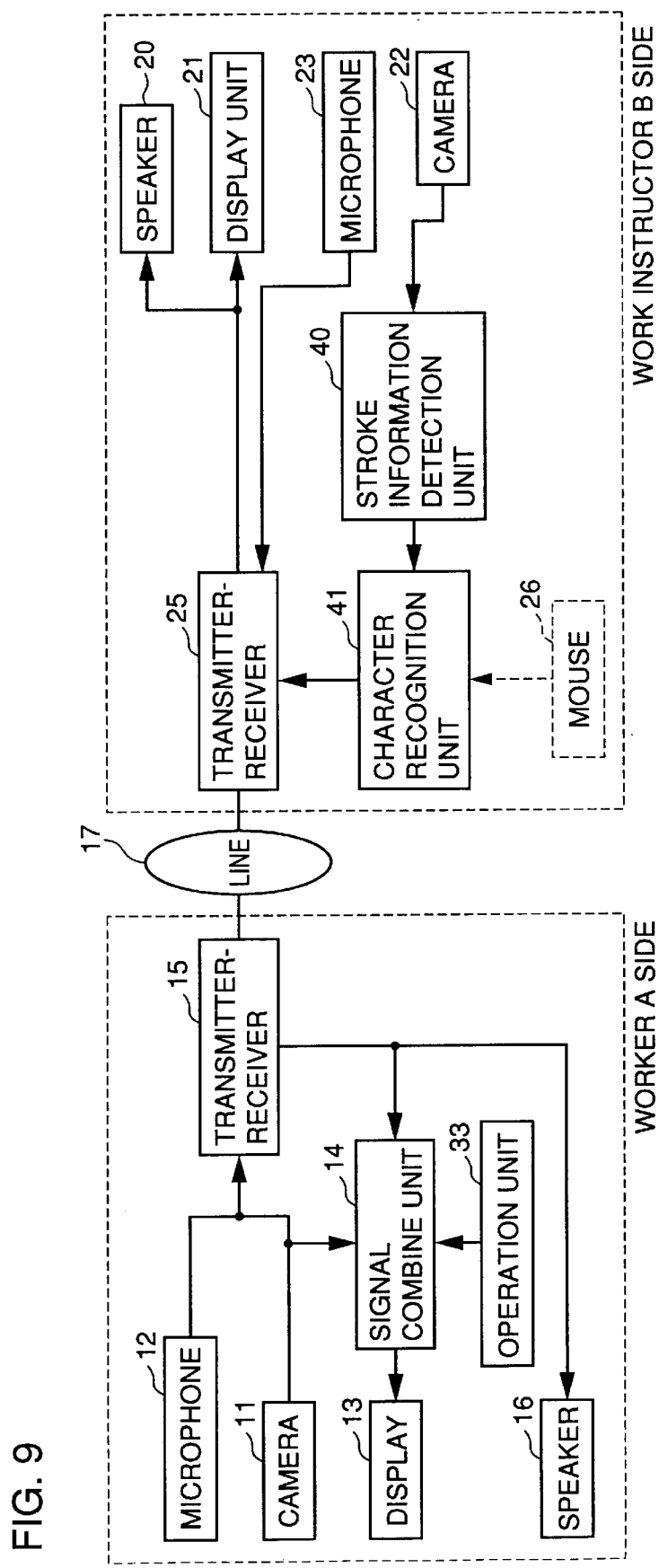
FIG. 9 is a schematic block diagram of an information transmission system according to a fourth embodiment of the present invention.

In the information transmission system of the fourth embodiment of FIG. 9, a character recognition unit 41 is provided to carry out a character recognition process according to the stroke information output from stroke information detection unit 40 to extract the code information of the relevant character and converting the same into character information which is supplied to transmitter-receiver 25. Character recognition unit 41 carries out character recognition according to the stroke information by the well-known character recognition process. The process carried out by character recognition unit 41 is disclosed in, for example, "Direction-Change Features of Imaginary Strokes for On-line Handwriting Character Recognition", 14th ICPR, Vol.2, pp.1747–1751, 1998 by M. Okamoto, A. Nakamura and K. Yamamoto. The disclosure of this document is incorporated by reference herein. Therefore, detailed description of the character recognition process will not be repeated here.

The character information output from character recognition unit 41 and the voice instruction of work instructor B collected by microphone 23 are transmitted to the worker A side via transmitter-receiver 25 and line 17. The character video information is supplied to signal combine unit 14. The voice information is applied to speaker 16.

Figure 10B:
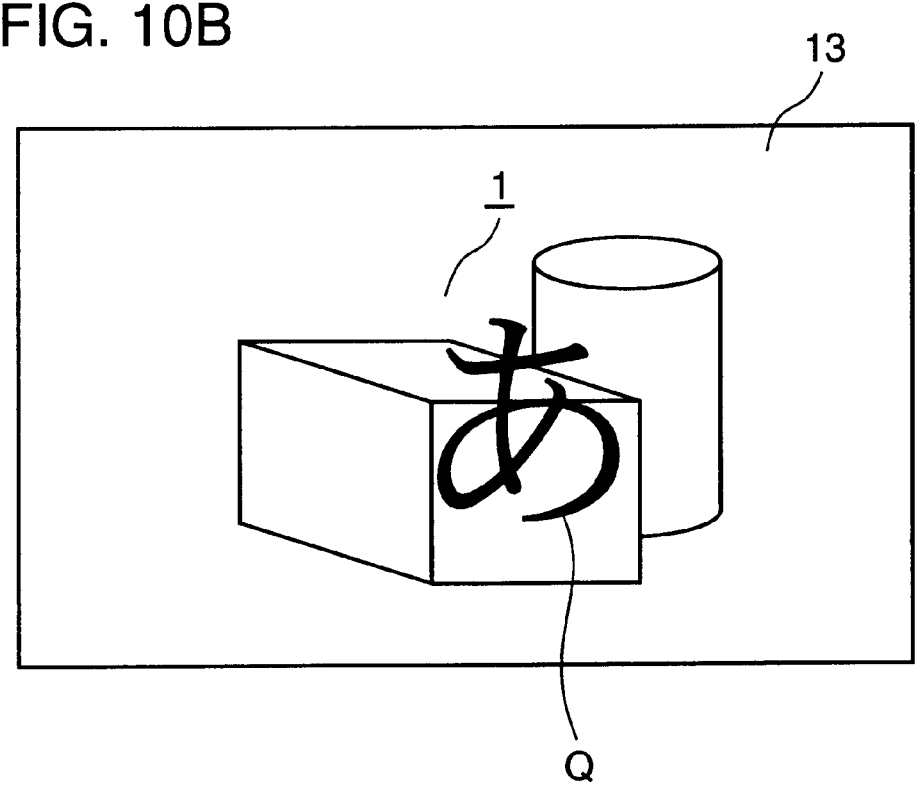
Figure 11A:
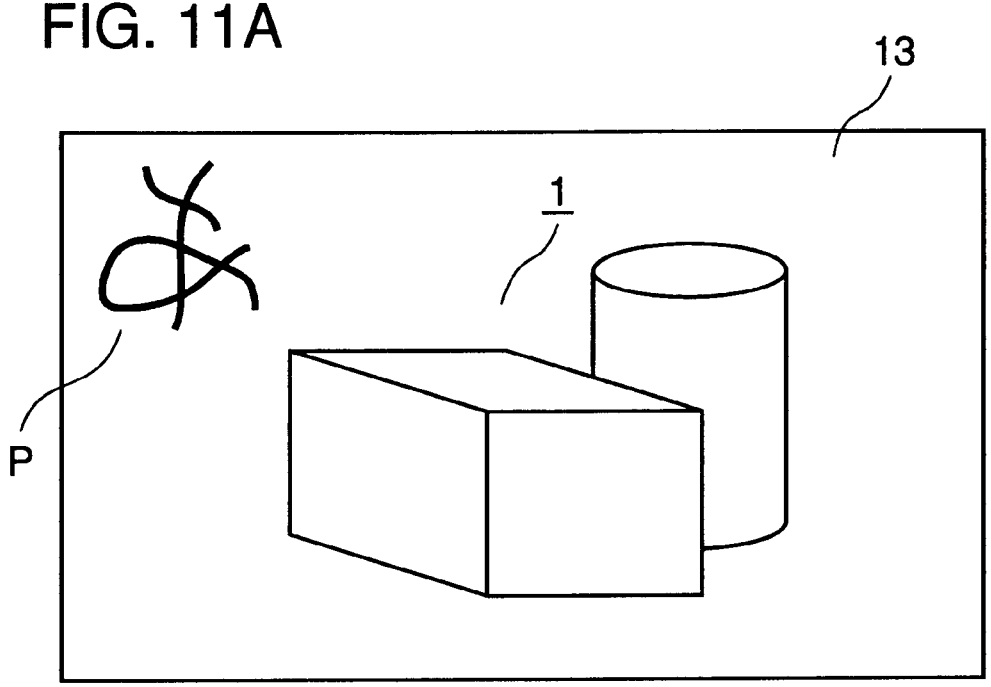
FIGS. 11A and 11B are schematic diagrams showing other forms of images displayed to the worker in the information transmission systems of the third and fourth embodiments, respectively.
Figure 11B:
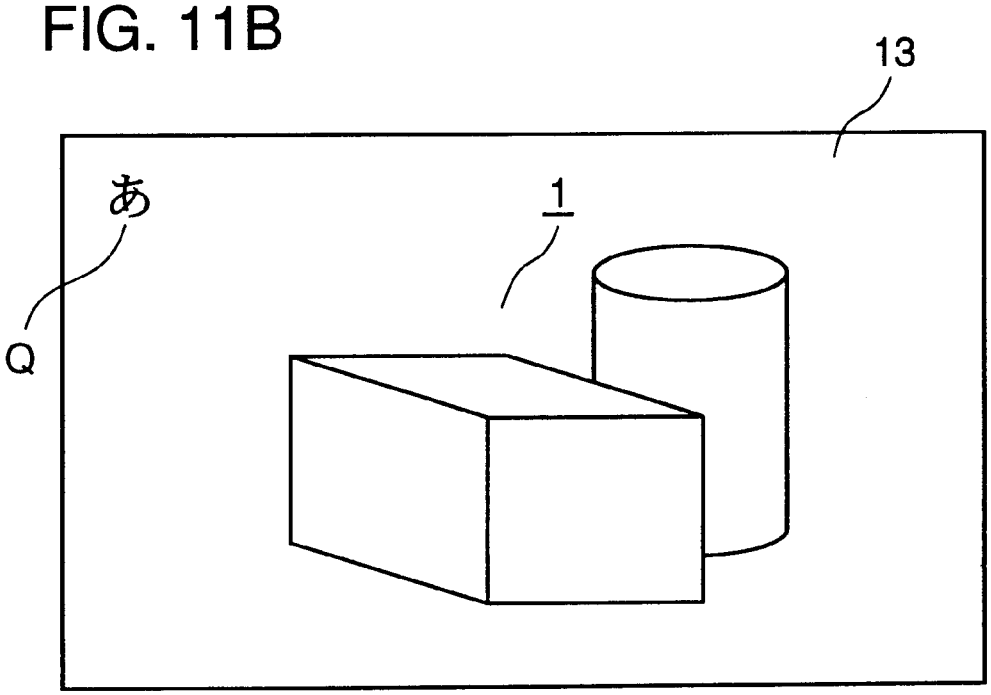

At signal combining unit 14, character video information is generated according to the received character information. The character video information is overlapped on the video information of a region approximating the worker A's field of view supplied from camera 11 to be displayed on display 13 contained in head mount type display device 10. FIG. 10B schematically shows the image of object 1 and character image Q displayed on display 13. At the same time, the voice of the work instructor explaining the work procedure is output from speaker 16 contained in head mount type display device 10.

Since character image Q is overlapped on the image of object 1 as 10 shown in FIG. 10B, there is a case where the view of object 1 is deteriorated by the overlap.

In this case, worker A can operate operation unit 33 provided at the side plane of head mount type display device 10 to arbitrarily specify the display position of the character image so that character image Q is shifted to a position that does not overlap on the image of object 1.

However, there may be a case where the character image itself is so large that it will inevitably overlap with the image of object 1 even if the display position is altered. There may also be the case where the character image is too small to be viewed clearly. In these cases, worker A can operate operation unit 33 to specify arbitrarily the size of the character image such as shrinking the character image (for example, reduced to 50%) to avoid overlapping on object 1 when the character image is too large, or magnifying the character image (for example, increased to 150%) to a size for better visibility when the character image is too small.

When the character image is not necessary, worker A can operate operation unit 33 to command inhibition of the overlap of the character image on the image of object 1.

According to various commands from operation unit 33, signal combining unit 14 displays on display 13 the character image at the position and in the display scale rate specified through operation unit 33, and also displays only the image of object 1 without overlapping the character image when overlapping of the character image is inhibited through operation unit 33.

Thus, worker A wearing head mount type display device 10 can visually recognize the character image overlapped on the image of object 1, so that the work procedure can be understood instantly. The working efficiency can be further improved since the explanation of the work procedure is provided through the voice of work instructor B. Also, recognition through the visual image of object 1 can be further facilitated by arbitrarily specifying the size and position of the character image or by removing the character image from the display screen through operation unit 33.

The amount of data can be reduced significantly in the case of transmitting character information as in the fourth embodiment in comparison to the case where stroke information is transmitted as in the third embodiment.

In the fourth embodiment, character information is detected by the character recognition of the stroke information. Alternatively, character information can be input using an input device such as a mouse 26.

(5) Fifth Embodiment

In the information transmission systems of the third and fourth embodiments shown in FIGS. 7–11B, the stroke image or character image provided by the work instructor can be displayed to the worker. In a complicated working environment, many task manuals will be required. However, this great amount of task manuals cannot be always carried by the worker. It is also difficult to identify at the working environment which section in the working manual the worker should refer to. Thus, there is a case where the worker may desire to view not only the character image together with object to be worked on, but also the task manual selected by an experienced technician.

Figure 12:
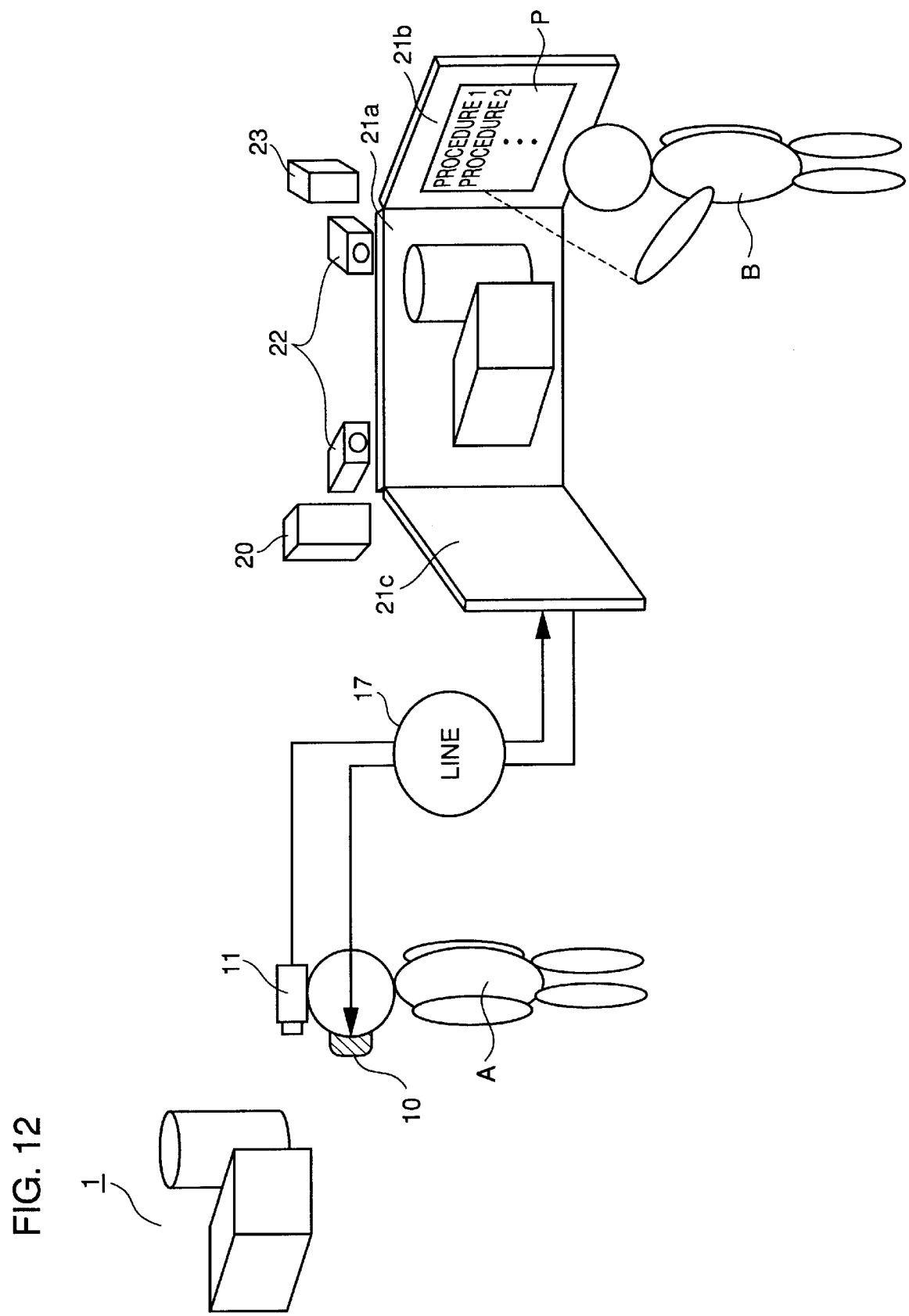
FIG. 12 schematically shows the concept of an information transmission system according to a fifth embodiment of the present invention.
Figure 13:
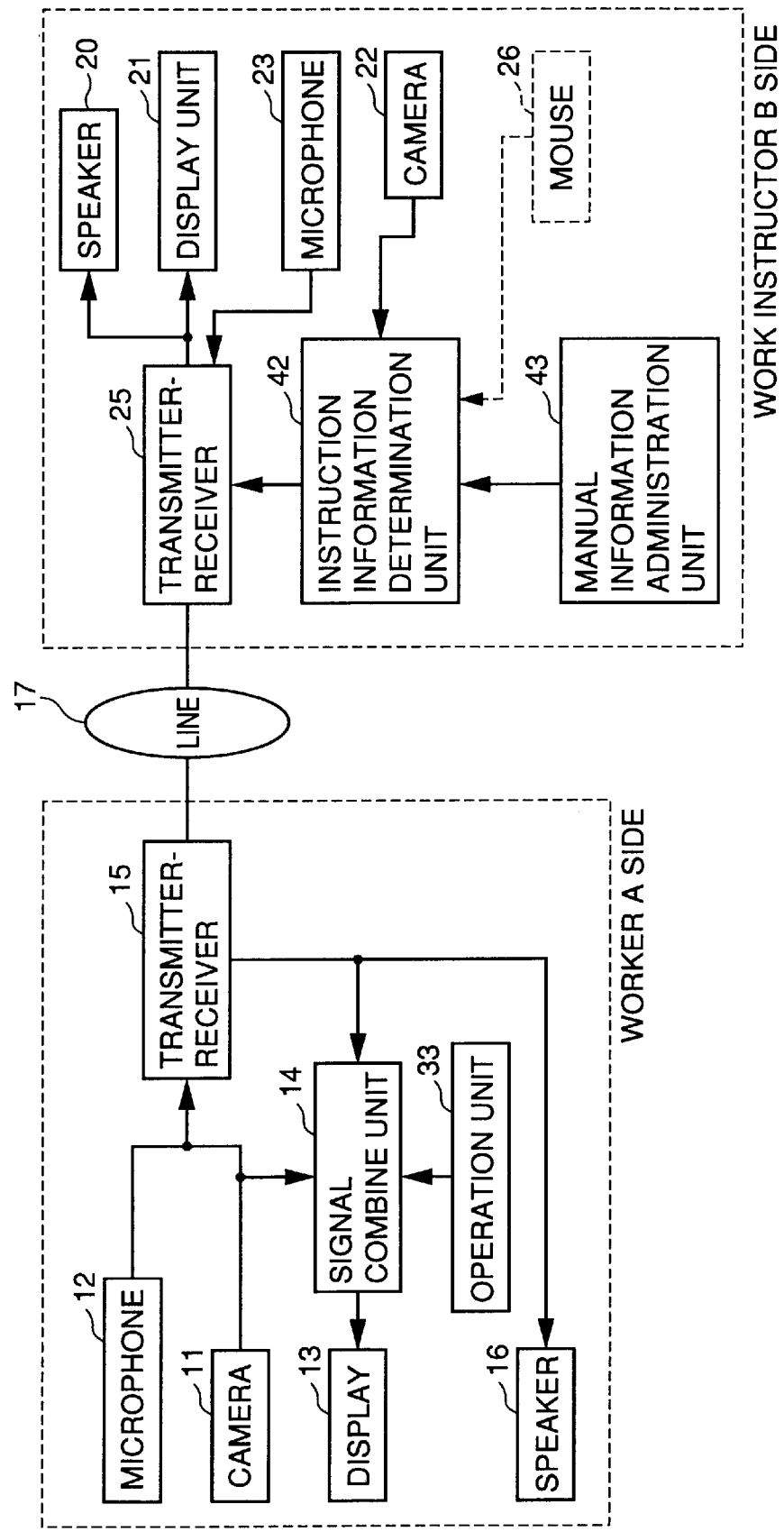
FIG. 13 is a schematic block diagram of the information transmission system according to the fifth embodiment.

FIGS. 12 and 13 show an information transmission system according to a fifth embodiment of the present invention capable of displaying such task manual information. The information transmission system of the fifth embodiment has a structure similar to that of the information transmission system of the third embodiment shown in FIG. 8 except for the features described hereinafter. Therefore, description of common elements will not be repeated.

In the information transmission system of the fifth embodiment shown in FIG. 13, a manual information administration unit 43 in which a plurality of task manual information files are stored is provided at the work instructor B side. Video information of the gesture of work instructor B shot by camera 22 is supplied to instruction information determination unit 42. Instruction information determination unit 42 determines the gesture of work instructor B as will be described afterwards, and displays the contents of a manual information administration unit 43 on display region 21b of display unit 21. Instruction information determination unit 42 also determines a further gesture of work instructor B to select a particular task manual information file which is one part of the displayed contents. The selected task manual information file is read out from manual information administration unit 43 and transmitted to transmitter-receiver 15 at the worker A side via transmitter-receiver 25 and line 17.

The task manual information file received at transmitter-receiver 15 is overlapped on the video information of object 1 from camera 11 by signal combining unit 14. The resultant video information is displayed to worker A through display 13. Worker A commands the combine operation of the information at signal combining unit 14 by means of operation unit 33 provided at the side plane of head mount type display device 10.

The operation of the information transmission system according to the fifth embodiment of the present invention shown in FIGS. 12 and 13 will be described here.

The image of object 1 shot by camera 11 of worker A is displayed on display unit 21 of the work instructor B side, as in the first to fourth embodiments. Work instructor B carries out a particular indication movement while viewing the image of object 1 displayed on display unit 21. This indication movement is shot by camera 22. Video information indicating that gesture is supplied to instruction information determination unit 42. Instruction information determination unit 42 recognizes the indication movement of work instructor B by the well-known gesture recognition process, direction detection process, and the like. In response, a list of a plurality of task manual information files stored in manual information administration unit 43 is displayed on display region 21b of display unit 21.

Work instructor B then carries out an indication movement of selecting a task manual information file to be transmitted to worker A while viewing the displayed list. This indication movement of work instructor B is shot by camera 22. Video information indicating that gesture is supplied to instruction information determination unit 42. Instruction information determination unit 42 recognizes the indication movement of work instructor B to read out a task manual information file specified by work instructor B out of the plurality of task manual information files from manual information administration unit 43. The content is displayed on display region 21b of display unit 21 and also transmitted to transmitter-receiver 15 at the worker A side via transmitter-receiver 25 and line 17. Similarly, the voice instruction of work instructor B collected through microphone 23 is transmitted to the worker A side via transmitter-receiver 25 and line 17.

Figure 14:
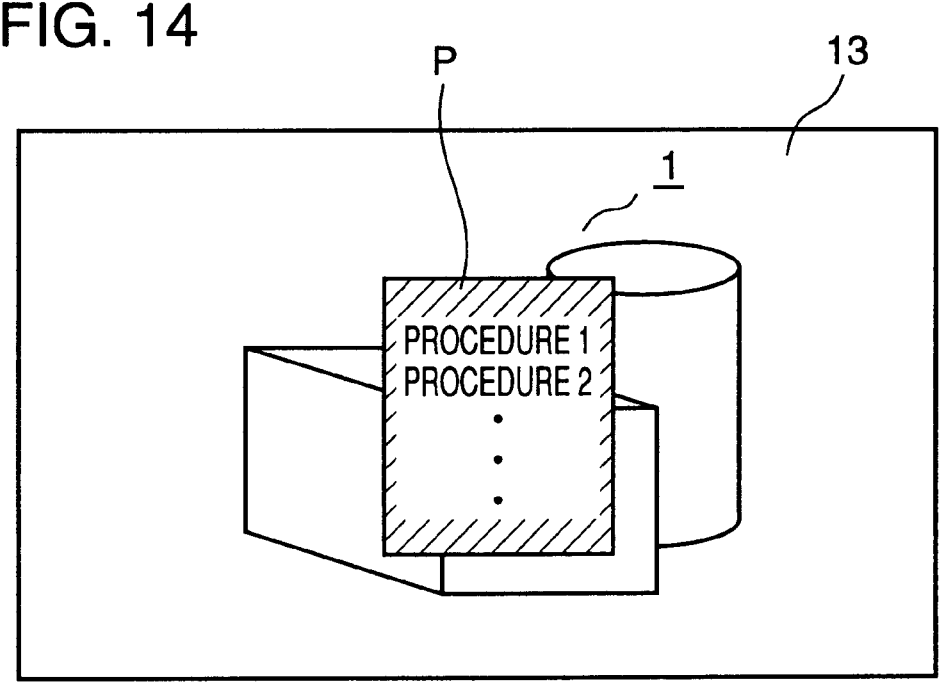
FIG. 14 is a schematic diagram showing a form of an image displayed to the worker in the information transmission system of the fifth embodiment.

The task manual information file is supplied to signal combining unit 14. The voice information is supplied to speaker 16. At signal combining unit 14, task manual video information is generated according to the received task manual information file. Then, the task manual video information is overlapped on the video information of a region approximating the worker A's field of view supplied from camera 11, and displayed on display 13 contained in head mount type display device 10. FIG. 14 schematically shows the image of object 1 and task manual image P displayed on display 13. At the same time, the voice of work instructor B is output from speaker 16 contained in head mount type display device 10.

Then, work instructor B views the contents of the selected task manual information file displayed on display region 21b of display unit 21 to input pointing position information into instruction information determination unit 42 while indicating each of procedures 1, 2, . . . by pointing on the coordinates within the range of the task manual image using the pointing indication method described in the first embodiment and provides work instructions through voice.

The gesture recognition process, the direction detection process and the like of the work instructor carried out by instruction information determination unit 42 are well-known, as disclosed in the aforementioned documents. By incorporating these documents by reference herein, description of detailed processes thereof will not be repeated.

Since task manual image P is overlapped on the image of object 1, there may be a case where visual confirmation of object 1 is difficult depending upon the overlapping manner, as shown in FIG. 14.

Figure 15:
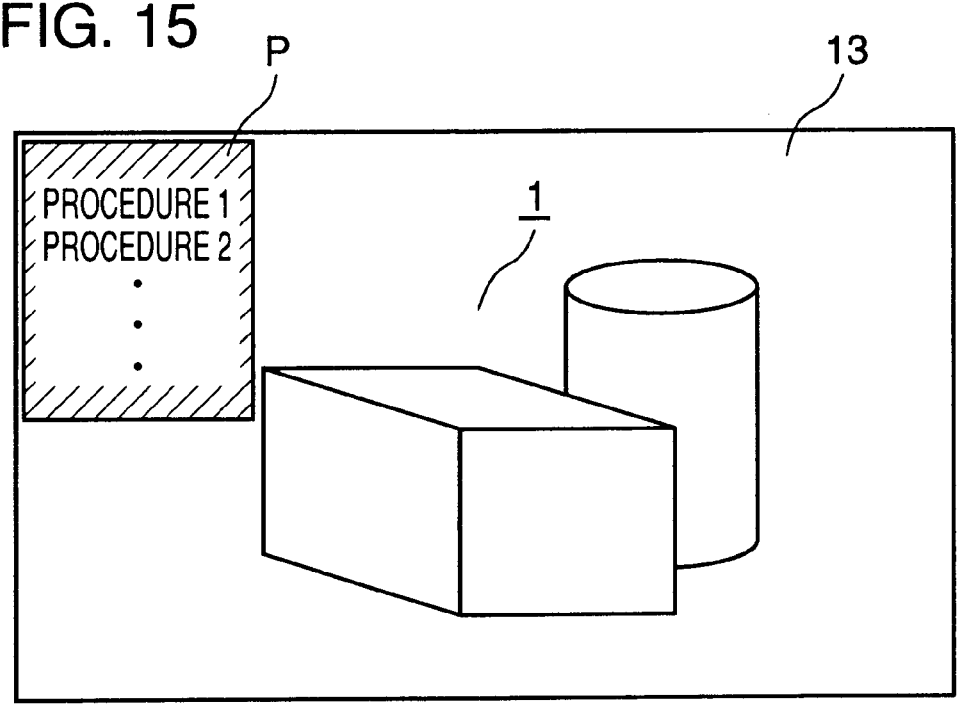
FIG. 15 is a schematic diagram showing another form of an image displayed to the worker in the information transmission system of the fifth embodiment.

In this case, worker A can operate operation unit 33 provided at the side face of head mount type display device 10 to specify an arbitrary display position of task manual image P so as to shift task manual image P to a position that does not overlap with the image of object 1, as shown in FIG. 15.

However, there may be a case where the task manual image itself is so large that it will inevitably overlap with the image of object 1 even if the display position is altered. There may also be the case where the task manual image is too small to be viewed clearly. In these cases, worker A can operate operation unit 33 to specify arbitrarily the size of the task manual image such as shrinking the task manual image (for example, reduced to 50%) to avoid overlapping on object 1 when the task manual image is too large, or magnifying the task manual image (for example, increased to 150%) to a size for better visibility when the task manual image is too small.

When the task manual image is not necessary, worker A can operate operation unit 33 to command inhibition of the overlap of the task manual image on the image of object 1.

According to various commands from operation unit 33, signal combining unit 14 displays on display 13 the task manual image at the position and in the display scale rate specified through operation unit 33, and also displays only the image of object 1 without overlapping the task manual image when overlapping of the task manual image is inhibited through operation unit 33.

Thus, worker A wearing head mount type display device 10 can visually recognize the task manual image overlapped on the image of object 1, so that the work procedure can be understood instantly. The working efficiency can be further improved since the pointing indication for each procedure and the explanation of the work procedure through the voice are provided by work instructor B at the same time. Also, recognition through the visual image of the working object can be further facilitated by arbitrarily specifying the size and position of the task manual image or by removing the task manual image from the display screen through operation unit 33.

In the fifth embodiment, the entire one task manual information file is transmitted to the worker A side. When the task manual image does not fit into the screen of display 13 at the worker A side, a portion of one task manual information file can be extracted at the work instructor B side and transmitted to the worker A side since the information cannot be scrolled on the screen at the worker A side.

In the fifth embodiment, selection of a task manual information file and the pointing indication of each work procedure are carried out by gesture recognition of work instructor B. Alternatively, this selection and pointing indication can be carried out using a coordinate information input device such as a mouse 26.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information transmission system for transmitting work instruction information from a work instructor to a worker, comprising:

an image pickup device fastened to the head of said worker, and picking up an image of an object to be worked on within a range including at least said worker's field of view, a first transmission device transmitting video information of said object generated by said image pickup device to said work instructor side, a first display device displaying said video information transmitted from said first transmission device to said work instructor, a position information input device entering pointing position information with respect to said object by said work instructor based on said video information displayed on said first display device, a second transmission device transmitting said pointing position information input by said position information input device to said worker side, a moving distance detection device detecting a spatial moving distance of said worker's head during a time starting from an image pickup time by the image pickup device up to the time the pointing position information reaches said worker side, a correction device correcting said pointing position information obtained at said worker side corresponding to said spatial moving distance of the head detected by said moving distance detection device, an information combining device combining said video information of said object generated by said image pickup device and marker video information according to said pointing position information corrected by said correction device, and a second display device displaying information combined by said information combine device to said worker.

2. The information transmission system according to claim 1, wherein said position information input device comprises:

a second image pickup device shooting a work indication movement by said work instructor, and a position information detection device detecting said pointing position information according to video information of said work indication movement generated by said second image pickup device.

3. The information transmission system according to claim 1, wherein said position information input device comprises a coordinate information input device entering coordinate information on an image displayed on said first display device corresponding to the pointing position indicated by said work instructor.

4. The information transmission system according to claim 1, further comprising a voice information transmission device transmitting voice information between said work instructor and said worker.

* * * * *